Patented Jan. 4, 1944

2,338,493

UNITED STATES PATENT OFFICE 2,338,493

TRIAZINE DERIVATIVES

Gaetano F. D'Alelio and James W. Underwood, Pittsfield, Mass., assignors to General Electric Company, a corporation of New York No Drawing. Application August 22, 1942, Serial No. 455,811

16 Claims. (Cl. 260—249.5)

This invention relates to the production of new chemical compounds and more particularly to triazine derivatives. The invention especially is concerned with the production of new and useful poly-(triazinyl hydrazino) derivatives of polycarboxylic acids.

The chemical compounds of this invention may be represented by the following general formula I 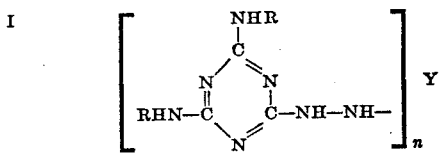

where R represents a member of the class consisting of hydrogen and monovalent hydrocarbon and substituted hydrocarbon radicals, more particularly halo-hydrocarbon radicals, Y represents a polyacyl radical of a polycarboxylic acid, more particularly an aliphatic or an aromatic polycarboxylic acid, and $n$ is an integer having a value equal to the valency of the polyacyl radical of Y. In the compounds represented by the above formula and by similar formulas hereafter given the grouping within the brackets, which grouping contains an incompletely satisfied nitrogen atom, is linked to a carbonyl group of the polyacyl radical represented by Y through a nitrogen to carbon bond.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, anthracyl, etc.); aliphatic-substituted aryl (e. g., tolyl, xylyl, ethylphenyl, propylphenyl, isopropylphenyl, allylphenyl, 2-butenylphenyl, tertiary-butyl-phenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, dichlorophenyl, ethyl chlorophenyl, chlorocyclohexyl, phenyl chloroethyl, bromoethyl, bromopropyl, iodophenyl, fluorophenyl, bromotolyl, etc. Preferably R in Formula I is hydrogen, in which case the compounds may be represented by the general formula:

II 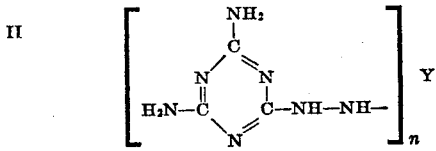

where $n$ and Y have the same meanings as given above with reference to Formula I.

Illustrative examples of polyacyl radicals that Y in Formulas I and II may represent are: aliphatic acyl (e. g., oxalyl, malonyl, succinyl, glutaryl, adipyl, tricarballylyl, etc.), including unsaturated aliphatic acyl, e. g., maleyl, fumaryl, glutaconyl, itaconyl, citraconyl, mesaconyl, glutinyl, aconityl, muconyl, etc.; and aromatic acyl, e. g., phthalyl, naphthalyl, trimesyl, chlorophthalyl, bromophthalyl, isophthalyl, terephthalyl, etc. Preferably Y is a succinyl or a phthalyl radical.

The new compounds of this invention may be used, for example, as pharmaceuticals, plasticizers and as intermediates in the preparation of derivatives thereof, e. g., methylol, methylene, etc., derivatives of the individual compound embraced by Formula I. These new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. Such condensation products are more fully described and are specifically claimed in our copending application Serial No. 458,130, filed September 12, 1942, and assigned to the same assignee as the present invention.

Various methods may be employed to produce the chemical compounds of this invention. One suitable method comprises effecting reaction, in the presence of a hydrohalide acceptor, between a triazine derivative corresponding to the general formula III 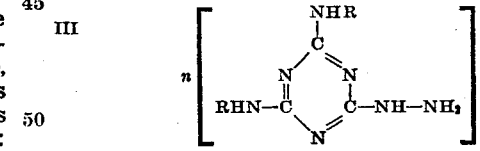

and an acyl halide corresponding to the general formula

IV 

where X represents a halogen atom, and $n$, Y and R have the same meanings given above with reference to Formula I, each halogen atom represented by X being linked directly to a carbon atom of a carbonyl group of the polyacyl radical represented by Y.

Illustrative examples of hydrazino-substituted triazines that may be employed, depending upon the particular end-product sought, are:

Hydrazino diamino s-triazine (2-hydrazino 4,6-diamino s-triazine; 4-hydrazino 2,6-diamino s-triazine; 6-hydrazino 2,4-diamino s-triazine)
Hydrazino di-(methylamino) s-triazine
Hydrazino di-(ethylamino) s-triazine
2-hydrazino 4-methylamino 6-amino s-triazine
2-hydrazino 4-ethylamino 6-amino s-triazine
2-hydrazino 4-ethylamino 6-methylamino s-triazine
Hydrazino di-(pentylamino) s-triazine
Hydrazino di-(isobutylamino) s-triazine
Hydrazino di-(propenylamino) s-triazine
Hydrazino di-(butenylamino) s-triazine
Hydrazino di-(phenylamino) s-triazine (hydrazino dianilino s-triazine)
Hydrazino di-(chloroanilino) s-triazine
2-hydrazino 4-anilino 6-amino s-triazine
Hydrazino di(propylamino) s-triazine
2-hydrazino 4-anilino 6-methylamino s-triazine
Hydrazino ditoluido s-triazine
Hydrazino dixylidino s-triazine
Hydrazino di-(naphthylamino) s-triazine
Hydrazino di-(ethylphenylamino) s-triazine
Hydrazino di-(phenethylamino) s-triazine
Hydrazino di-(cinnamylamino) s-triazine
Hydrazino di-(chloromethylamino) s-triazine
Hydrazino di-(bromoethylamino) s-triazine
Hydrazino di-(bromoanilino) s-triazine
Hydrazino di-(bromotoluido) s-triazine
Hydrazino di-(cyclohexylamino) s-triazine
Hydrazino di-(allylamino) s-triazine
Hydrazino di-(octylamino) s-triazine
Hydrazino di-(iodoanilino) s-triazine
Hydrazino di-(hexylamino) s-triazine Illustrative examples of acyl halides embraced by Formula IV that may be used, depending upon the desired end-product, are:

Oxalyl chloride (ethandioyl chloride)
Malonyl chloride
Malonyl bromide
Succinyl chloride
Succinyl bromide
Succinyl iodide
Adipyl chloride
Glutaryl chloride
Pimelyl chloride
Suberyl chloride
Sebacyl chloride
Tricarballylyl chloride
Maleyl chloride
Fumaryl chloride
Glutaconyl chloride
Itaconyl chloride
Citraconyl chloride
Mesaconyl chloride
Phthalyl chloride
Phthalyl bromide
Trimesyl chloride
Chloronaphthalyl chloride
Bromonaphthalyl bromide
Chlorophthalyl chloride
Bromophthalyl bromide
Naphthalyl chloride Various hydrohalide acceptors may be employed but we prefer to use a tertiary base e. g., tertiary amines such as trialkyl (e. g., trimethyl, triethyl, tripropyl, tributyl, etc.) amines triaryl (e. g., triphenyl, tritolyl, etc.) amines, pyridine, dimethyl aniline, etc. The reaction between the hydrazino-substituted triazine and the acyl halide may be carried out in any suitable manner, but preferably is effected in the presence of a suitable solvent or mixture of solvents. It is advisable to use an anhydrous liquid medium, e. g., ether, benzene, toluene, etc., because of the high degree of reactivity of the acyl halide. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

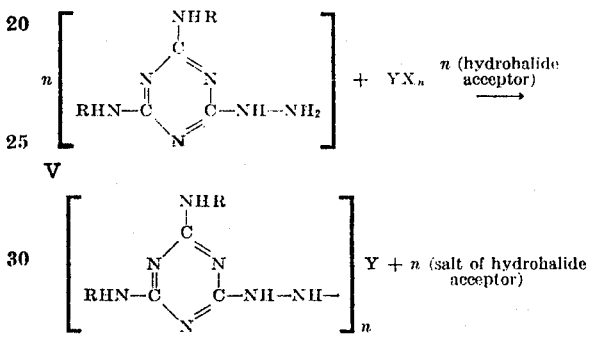

where X represents a halogen atom, and $n$, Y and R have the same meanings as given above with reference to Formula I, each halogen atom represented by X being linked directly to a carbon atom of a carbonyl group of the polyacyl radical represented by Y.

Another method that may be employed in preparing the new chemical compounds of this invention comprises effecting reaction between a monohalogeno diamino [(—NHR)₂] triazine and a polyhydrazide of a polycarboxylic acid. This reaction preferably is carried out in the presence of a suitable solvent or mixture of solvents. A hydrohalide acceptor also preferably is present.

In order that those skilled in the art better may understand how the present invention may be carried into effect, the following examples are given by way of illustration and not by way of limitation. All parts are by weight.

*Example 1*

This example illustrates the preparation of alpha,beta-bis-(diamino s-triazinyl hydrazinocarbonyl) ethane, the formula for which is

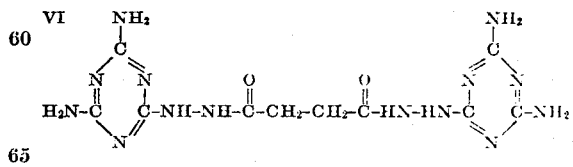

This compound also may be named succinyl bis-(diamino s-triazinyl hydrazide).

|  | Parts | Approx. mol ratio |
|---|---|---|
| Hydrazino diamino s-triazine | 100.0 | 2 |
| Succinyl chloride | 55.0 | 1 |
| Pyridine | 56.1 | 2 |

The succinyl chloride was added slowly to the mixture of the other components, while shaking the mixture and simultaneously cooling it. The reaction was exothermic. After the reaction had subsided, the reaction flask was stoppered and shaken for 6 hours at room temperature. After standing for about 16 hours at room temperature, the solid reaction product comprising alpha,beta-bis-(diamino s-triazinyl hydrazinocarbonyl) ethane was filtered off, washed well with water and dried. A yield of 115 parts of the purified material was obtained.

*Example 2*

Bis-(diamino s-triazinyl hydrazinocarbonyl) is prepared in essentially the same manner as described under Example 1 with the exception that 45 parts of oxalyl chloride are used in place of 55 parts of succinyl chloride.

*Example 3*

Alpha,beta-bis-[di-(methylamino) s-triazinyl hydrazinocarbonyl] ethane is prepared in essentially the same manner as described under Example 1 with the exception that 119.9 parts of hydrazino di-(methylamino) s-triazine are used in place of 100 parts of hydrazino diamino s-triazine.

*Example 4*

Alpha,beta,gamma-tri-(diamino s-triazinyl hydrazinocarbonyl) propane is prepared in essentially the same manner as described under Example 1 with the exception that 54.8 parts of tricarballylyl chloride are used instead of 55 parts of succinyl chloride.

*Example 5*

Bis-(diamino s-triazinyl hydrazinocarbonyl) benzenes are prepared in essentially the same manner as described under Example 1 with the exception that 72 parts of a phthalyl chloride (ortho-phthalyl dichloride, iso-phthalyl dichloride or terephthalyl dichloride) are used in place of 55 parts of succinyl chloride.

Illustrative examples of other chemical compounds embraced by Formula I that may be produced in accordance with the present invention are listed below, including both poly-(diamino s-triazinyl hydrazinocarbonyl)-substituted aliphatic hydrocarbons, more particularly bis-(diamino s- triazinyl hydrazinocarbonyl) alkanes and alkenes, and poly-(diamino s-triazinyl hydrazinocarbonyl)-substituted aromatic hydrocarbons:

Bis-[di-(methylamino) s-triazinyl hydrazinocarbonyl] methane
Bis - (diamino s - triazinyl hydrazinocarbonyl) methane
Alpha,omega-bis-(diamino s-triazinyl hydrazinocarbonyl) butane
Alpha,beta-bis-[di-(ethylamino) s-triazinyl hydrazinocarbonyl] ethane
Bis - (dianilino s-triazinyl hydrazinocarbonyl) methane
Bis-[di-(isobutylamino) s-triazinyl hydrazinocarbonyl] methane
Alpha,beta-bis-(diamino s-triazinyl hydrazinocarbonyl) ethane
Bis - (diamino s - triazinyl hydrazinocarbonyl) pentanes
2,3-bis-(diamino s-triazinyl hydrazinocarbonyl) 1-propene
Alpha,beta-bis-(diamino s-triazinyl hydrazinocarbonyl) butane
Alpha,beta-bis-[di - (propenylamino) s - triazinyl hydrazinocarbonyl] propane
Bis - (diamino s - triazinyl hydrazinocarbonyl) toluenes
Bis -(diamino s - triazinyl hydrazinocarbonyl) xylenes
Bis -(diamino s - triazinyl hydrazinocarbonyl) chlorobenzenes
Bis -(diamino s - triazinyl hydrazinocarbonyl) naphthalenes
Bis-[di-methylamino) s-triazinyl hydrazinocarbonyl] benzenes
Bis-(4-anilino 6-amino s-triazinyl-2 hydrazinocarbonyl) methane
Bis-(4-methylamino 6-amino s-triazinyl-2 hydrazinocarbonyl)
Bis-(4-anilino 6-methylamino s-triazinyl-2 hydrazinocarbonyl) benzenes
Bis-(ditoluido s-triazinyl hydrazinocarbonyl) benzenes
Alpha,beta-bis-(dixylidino s-triazinyl hydrazinocarbonyl) ethane
Alpha,beta-bis-[di-(phenethylamino) s-triazinyl hydrazinocarbonyl] ethane
Bis-[di-(ethylanilino) s-triazinyl hydrazinocarbonyl] benzenes
1,3,5-tri-(diamino s-triazinyl hydrazinocarbonyl) benzene
Bis -(diamino s - triazinyl hydrazinocarbonyl) bromobenzenes
Bis-[di-(chloromethylamino) s-triazinyl hydrazinocarbonyl]
Bis-[di-(bromanilino) s-triazinyl hydrazinocarbonyl] methane
Bis -(diamino s - triazinyl hydrazinocarbonyl) chloropropanes
Bis-[di-(allylamino) s - triazinyl hydrazinocarbonyl] methane
Bis-[di-(cyclohexlamino) s-triazinyl hydrazinocarbonyl] ethanes
Bis-[di-(octylamino) s-triazinyl hydrazinocarbonyl] propanes
Bis-[di-(fluoroanilino) s-triazinyl hydrazinocarbonyl] butanes
Bis-[di-(iodotoluido) s-triazinyl hydrazinocarbonyl] isopentanes
Bis-[di-(bromoanilino) s-triazinyl hydrazinocarbonyl] heptanes
Bis-[di-(chlorotoluido) s-triazinyl hydrazinocarbonyl] benzenes
Bis-[di-(cyclohexenylamino) s-triazinyl hydrazinocarbonyl] naphthalenes
Bis-[di-(pentylamino) s-triazinyl hydrazinocarbonyl] chloronaphthalenes
Bis-[di-(xenylamino) s-triazinyl hydrazinocarbonyl] xylenes
Bis-[di-(naphthylamino) s-triazinyl hydrazinocarbonyl] ethylbenzenes
Bis-[di-(chloroethylamino) s-triazinyl hydrazinocarbonyl] toluenes
Bis-[di-(butylamino) s-triazinyl hydrazinocarbonyl] propanes
Bis-[di-(bromopropylamino) s-triazinyl hydrazinocarbonyl] butanes In a manner similar to that described above with particular reference to the production of poly-(symmetrical-triazinyl hydrazino) derivatives of polycarboxylic acids, corresponding derivatives of the asymmetrical triazines and of the vicinal triazines may be prepared.

What we claim as new and desire to secure by Letters Patent of the United States is:

1. Chemical compounds corresponding to the general formula

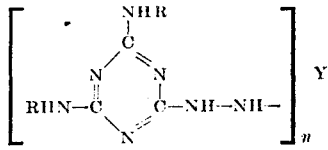

where R represents a member of the class consisting of hydrogen and monovalent hydrocarbon and halo-hydrocarbon radicals, Y represents a polyacyl radical of a polycarboxylic acid, and $n$ is an integer having a value equal to the valency of the polyacyl radical of Y, the grouping represented by the portion of the formula within the brackets being linked to a carbonyl group of the polyacyl radical represented by Y through a nitrogen to carbon bond.

2. Chemical compounds as in claim 1 wherein R represents hydrogen.

3. Chemical compounds as in claim 1 wherein Y represents a polyacyl radical of an aliphatic polycarboxylic acid.

4. Chemical compounds as in claim 1 wherein Y represents a polyacyl radical of an aromatic polycarboxylic acid.

5. Chemical compounds as in claim 1 wherein R represents hydrogen and Y represents a polyacyl radical of an aliphatic polycarboxylic acid.

6. Chemical compounds as in claim 1 wherein R represents hydrogen and Y represents a polyacyl radical of an aromatic polycarboxylic acid.

7. A poly-(diamino s-triazinyl hydrazinocarbonyl)-substituted aliphatic hydrocarbon.

8. A bis-(diamino s-triazinyl hydrazinocarbonyl)-substituted alkane.

9. Alpha,beta-bis-(diamino s-triazinyl hydrazinocarbonyl) ethane.

10. Bis-(diamino s-triazinyl hydrazinocarbonyl).

11. A poly-(diamino s-triazinyl hydrazinocarbonyl)-substituted aromatic hydrocarbon.

12. A bis-(diamino s-triazinyl hydrazinocarbonyl) benzene.

13. The method of preparing chemical compounds corresponding to the formula

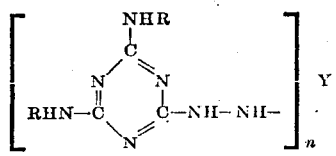

where R represents a member of the class consisting of hydrogen and monovalent hydrocarbon and halo-hydrocarbon radicals, Y represents a polyacyl radical of a polycarboxylic acid, and $n$ is an integer having a value equal to the valency of the polyacyl radical of Y, the grouping represented by the portion of the above formula within the brackets being linked to a carbonyl group of the polyacyl radical represented by Y through a nitrogen to carbon bond, said method comprising effecting reaction, in the presence of a hydrohalide acceptor, between a compound corresponding to the general formula

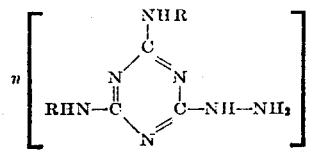

and an acyl halide corresponding to the general formula $$YX_n$$

where X represents a halogen atom, and $n$, Y and R have the same meanings as given above, each halogen atom represented by X being linked directly to a carbon atom of a carbonyl group of the polyacyl radical represented by Y.

14. A method as in claim 13 wherein the hydrohalide acceptor is a tertiary base and the reaction is carried out in an anhydrous liquid medium.

15. The method of preparing alpha,beta-bis-(diamino s-triazinyl hydrazinocarbonyl) ethane which comprises effecting reaction, in the presence of a hydrohalide acceptor, between succinyl chloride and hydrazino diamino s-triazine in the ratio of one mol of the former to approximately two mols of the latter.

16. A method as in claim 15 wherein the hydrohalide acceptor is pyridine.

GAETANO F. D'ALELIO.
JAMES W. UNDERWOOD.

CERTIFICATE OF CORRECTION.

Patent No. 2,338,493. January 4, 1944.

GAETANO F. D'ALELIO, ET AL.

It is hereby certified that error appears in the printed specification of the above numbered patent requiring correction as follows: Page 2, first column, line 26, after "di" and before "(propylamino) insert a hyphen; line 75, after "base" insert a comma; and second column, line 2, after "amines" insert a comma--; page 3, second column, line 14, before "methylamino" insert an opening parenthesis; and second column, line 39, for "bromanilino" read --bromoanilino--; line 45, for "cyclohexlamino" read --cyclohexylamino--; and that the said Letters Patent should be read with this correction therein that the same may conform to the record of the case in the Patent Office.

Signed and sealed this 28th day of March, A. D. 1944.

Leslie Frazer

Acting Commissioner of Patents.

(Seal)